(12) United States Patent
Tang et al.

(10) Patent No.: US 12,038,617 B2
(45) Date of Patent: Jul. 16, 2024

(54) OPTICAL TRANSCEIVER MODULE

(71) Applicant: 3M INNOVATIVE PROPERTIES COMPANY, St. Paul, MN (US)

(72) Inventors: Cheng Tang, Shanghai (CN); Shiwen Chen, Shanghai (CN); Changbao Ma, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 264 days.

(21) Appl. No.: 17/625,890

(22) PCT Filed: Jul. 16, 2019

(86) PCT No.: PCT/CN2019/096145
§ 371 (c)(1),
(2) Date: Jan. 10, 2022

(87) PCT Pub. No.: WO2021/007771
PCT Pub. Date: Jan. 21, 2021

(65) Prior Publication Data
US 2022/0260794 A1 Aug. 18, 2022

(51) Int. Cl.
*G02B 6/42* (2006.01)
(52) U.S. Cl.
CPC ........... *G02B 6/4246* (2013.01); *G02B 6/428* (2013.01)
(58) Field of Classification Search
CPC ............................. G02B 6/428; G02B 6/4246
See application file for complete search history.

(56) References Cited

U.S. PATENT DOCUMENTS

| 9,022,602 B2 | 5/2015 | Lekatsas |
| 9,581,776 B1* | 2/2017 | Lee ..................... G02B 6/4246 |
| 2005/0019973 A1 | 1/2005 | Chua |
| 2014/0211822 A1 | 7/2014 | Fattal |

(Continued)

FOREIGN PATENT DOCUMENTS

| CN | 203324526 | 12/2013 |
| CN | 107062160 | 8/2017 |

(Continued)

OTHER PUBLICATIONS

International Search Report for PCT International Application No. PCT/CN2019/096145, mailed on Apr. 15, 2020, 4 pages.

*Primary Examiner* — Sung H Pak
(74) *Attorney, Agent, or Firm* — Clifton F. Richardson

(57) ABSTRACT

An optical transceiver module includes a housing having an electrical mating end for mating with a mating electrical connector and an opposing optical mating end for mating with a mating optical connector. A circuit board assembly, a ferrule assembly, and a first support are disposed in the housing. The circuit board assembly includes an optical coupler disposed on a circuit board. The ferrule assembly includes an optical ferrule including a first attachment feature for receiving and permanently attaching to at least one optical fiber and a second attachment feature assembled to the optical coupler. A ferrule support is removably assembled to an interior of the housing and includes at least one support feature. The optical ferrule rests on the at least one support feature. The first support makes contact with the at least one optical fiber. The contact causes a bend in the at least one optical fiber.

14 Claims, 16 Drawing Sheets

(56) References Cited

U.S. PATENT DOCUMENTS

| | | |
|---|---|---|
| 2014/0341515 A1 | 11/2014 | Cole |
| 2015/0117824 A1 | 4/2015 | Wang |
| 2015/0131948 A1 | 5/2015 | Selli |
| 2015/0219863 A1 | 8/2015 | Haase |
| 2015/0234126 A1 | 8/2015 | Haase |
| 2015/0247979 A1 | 9/2015 | Richmond |
| 2017/0131488 A1 | 5/2017 | Yu |
| 2017/0219779 A1 | 8/2017 | Takano |
| 2018/0128996 A1 | 5/2018 | Sawicki |
| 2018/0136416 A1 | 5/2018 | Kurashima |
| 2018/0239091 A1 | 8/2018 | Mathews |
| 2018/0275353 A1 | 9/2018 | Haase |
| 2019/0049671 A1 | 2/2019 | Haase |
| 2020/0310054 A1 | 10/2020 | Epitaux |

FOREIGN PATENT DOCUMENTS

| | | |
|---|---|---|
| CN | 108885321 | 11/2018 |
| WO | W O2017-066019 | 4/2017 |
| WO | WO 2020-003117 | 1/2020 |
| WO | WO 2020-003124 | 1/2020 |
| WO | WO 2020-003245 | 1/2020 |
| WO | WO 2020-191613 | 10/2020 |

* cited by examiner

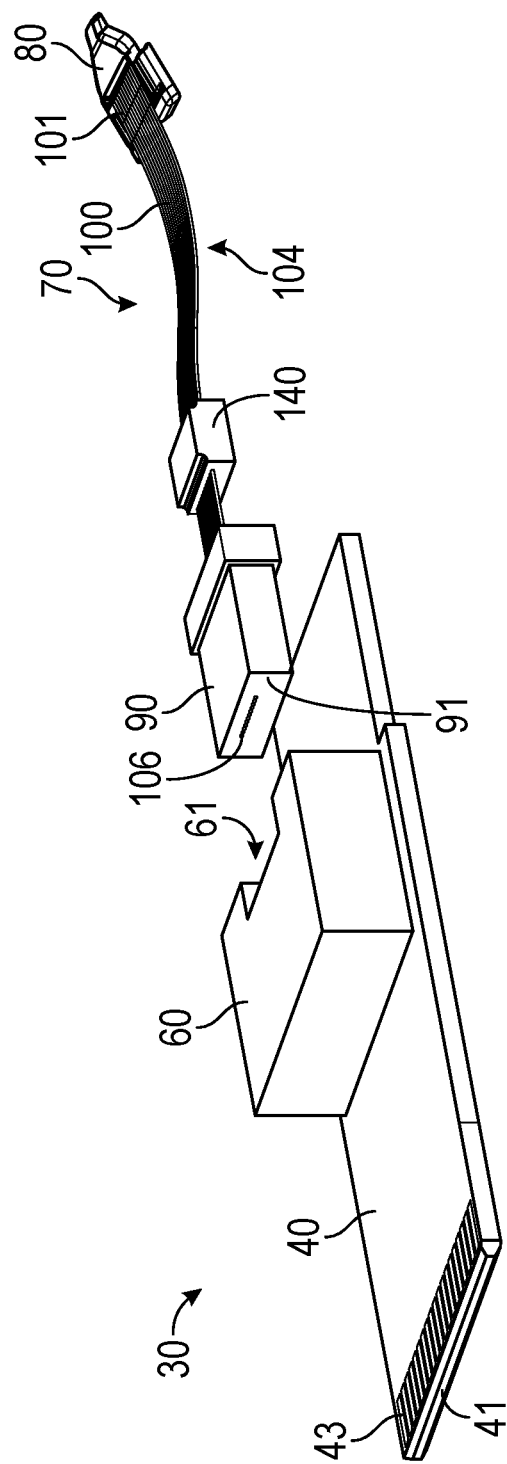
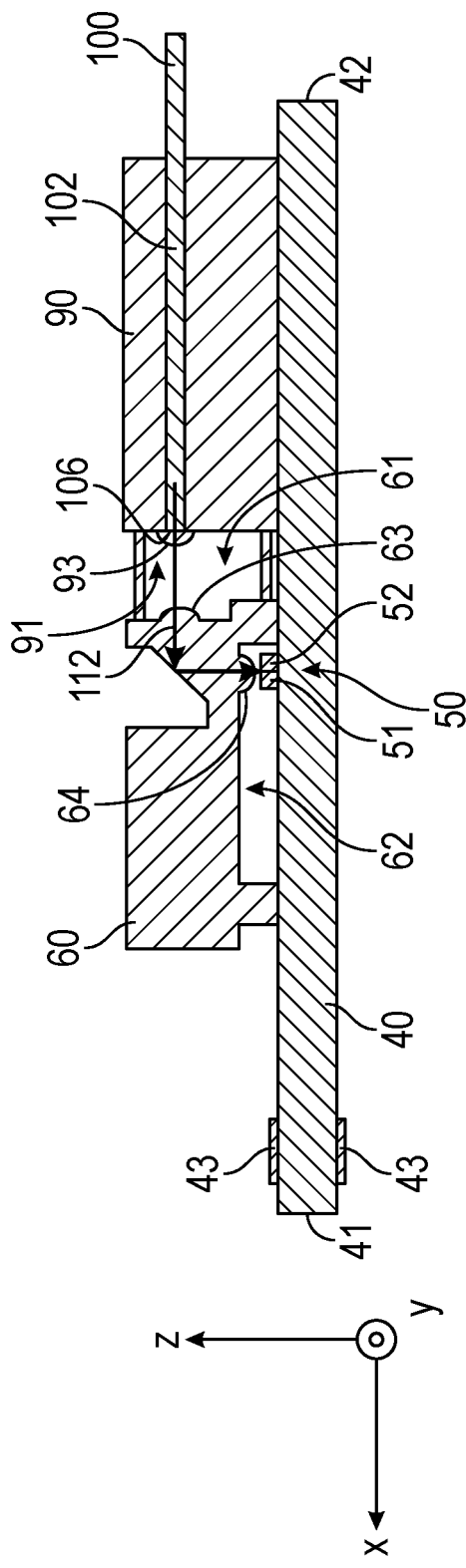
FIG. 2
FIG. 3

OPTICAL TRANSCEIVER MODULE

BACKGROUND

Multi-fiber optical connectors are known for telecommunications and data center applications. Such connectors may use an optical ferrule which can receive a plurality of optical fibers.

SUMMARY

In some aspects of the present description, an optical transceiver module is provided. The optical transceiver module includes a housing having an electrical mating end for mating with a mating electrical connector, and an opposing optical mating end for mating with a mating optical connector, a circuit board assembly disposed in the housing, a ferrule assembly disposed in the housing, a ferrule support removably assembled to an interior of the housing; and a first support disposed in the housing. The circuit board assembly includes: a circuit board including a front edge at the electrical mating end of the housing and an opposite rear edge; a plurality of conductive pads disposed proximate the front edge for making electrical contact with corresponding electrical contacts of the mating electrical connector; a transceiver disposed on the circuit board and including at least one light source and at least one light detector; and an optical coupler disposed on the circuit board and having an input side, and an output side optically coupled to, and aligned with, the transceiver. The ferrule assembly includes: an optical ferrule; a second attachment feature assembled to the optical coupler; and at least one optical fiber, a first end portion of which is permanently attached to the first attachment feature, and an opposite second end portion of which is permanently attached to the second attachment feature. The optical ferrule includes a first attachment feature for receiving and permanently attaching to at least one optical fiber, a light redirecting member, and an exit surface. Light exiting the at least one optical fiber from the first end portion is received by the light redirecting member along a first direction and redirected by the light redirecting member to a different second direction, the redirected light exiting the optical ferrule from the exit surface of the optical ferrule. Light exiting the at least one optical fiber from the second end portion enters the optical coupler through the input side of the optical coupler and is redirected by the optical coupler toward the transceiver. The ferrule support includes at least one support feature. The optical ferrule rests on the at least one support feature. The first support makes contact with the at least one optical fiber. The contact causes a bend in the at least one optical fiber.

In some aspects of the present description, an optical transceiver module is provided. The optical transceiver module includes a housing having an electrical mating end for mating with a mating electrical connector, and an opposing optical mating end for mating with a mating optical connector. The optical transceiver module further includes an optical ferrule and a ferrule support. The optical ferrule is coupled to an optical fiber and is disposed in the housing. The optical ferrule includes a light redirecting member configured to receive light from the optical fiber along a first direction and redirect the received light along a different second direction. The redirected light exits the optical ferrule from an exit surface of the optical ferrule. The ferrule support is removably assembled to an interior of the housing and includes: a base removably inserted into a slot formed in the interior of the housing where the base defines a first opening therein and the optical fiber is disposed in the first opening; and an elongated hollow portion extending from the base along a length of the optical transceiver module and defining a second opening therein opposite the first opening, such that when the optical transceiver module mates with the mating optical connector including a mating optical ferrule, the mating optical ferrule passes through the second opening before mating with the optical ferrule. The elongated hollow portion includes a wider hollow portion opposite a narrower hollow portion. The wider and narrower hollow portions defining opposing steps and opposing slots extending along the length of the optical transceiver module, such that when the optical transceiver module mates with the mating optical connector, a first portion of a mating housing of the mating optical connector resides on an outside of the narrower hollow portion, a second portion of the mating housing resides on an inside of the wider hollow portion, and a third portion of the mating housing resides on the opposing steps and in the opposing slots.

BRIEF DESCRIPTION OF THE DRAWINGS

FIG. 2 is a schematic perspective view of a portion of an optical transceiver module;

FIG. 3 is a schematic cross-sectional view of a portion of an optical transceiver module;

DETAILED DESCRIPTION OF ILLUSTRATIVE EMBODIMENTS

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments, an optical transceiver module is configured to mate with a mating electrical connector and with a mating optical connector. For example, in some embodiments, the optical transceiver module may be adapted to provide connection between a mating electrical connector having a conventional form factor and a mating optical connector having a conventional form factor (e.g., a multi-fiber push on (MPO) connector). The optical transceiver module may include an optical ferrule and the mating optical may include a mating optical ferrule that is configured to mate with the optical ferrule such that light can be transmitted from the optical transceiver module to the mating optical ferrule and received by the optical transceiver module from the mating optical ferrule. The optical ferrule and the mating optical ferrule may be hermaphroditic ferrules having a substantially same size and shape, for example.

Optical ferrules that may be used in the optical transceiver module and/or in the mating optical connector include those described in U.S. Pat. Appl. Publ. Nos. 2015/0219863 (Haase et al.), 2015/0234126 (Haase et al.), 2015/0247979 (Richmond et al.), 2018/0128996 (Sawicki et al.), 2018/0239091 (Mathews et al.), 2018/0275353 (Haase et al.), and 2019/0049671 (Haase et al.), for example, and in Prov. Appl. No. 62/806,146 titled "Optical Ferrule" and filed on Feb. 15, 2019, in Prov. Appl. No. 62/691,871 titled "Optical Ferrule Having Compound Stops" and filed on Jun. 29, 2018, and in Prov. Appl. No. 62/691,477 titled "Light Coupling Element and Assembly" and filed on Jun. 28, 2018, for example. In some embodiments, the optical ferrule and mating optical ferrule utilize expanded beam optics as described in U.S. Pat. Appl. Publ. Nos. 2015/0219863 (Haase et al.) and 2015/0234126 (Haase et al.), for example. Utilizing expanded beam optics can reduce dust sensitivity and reduce insertion loss, for example.

Figure 1A:
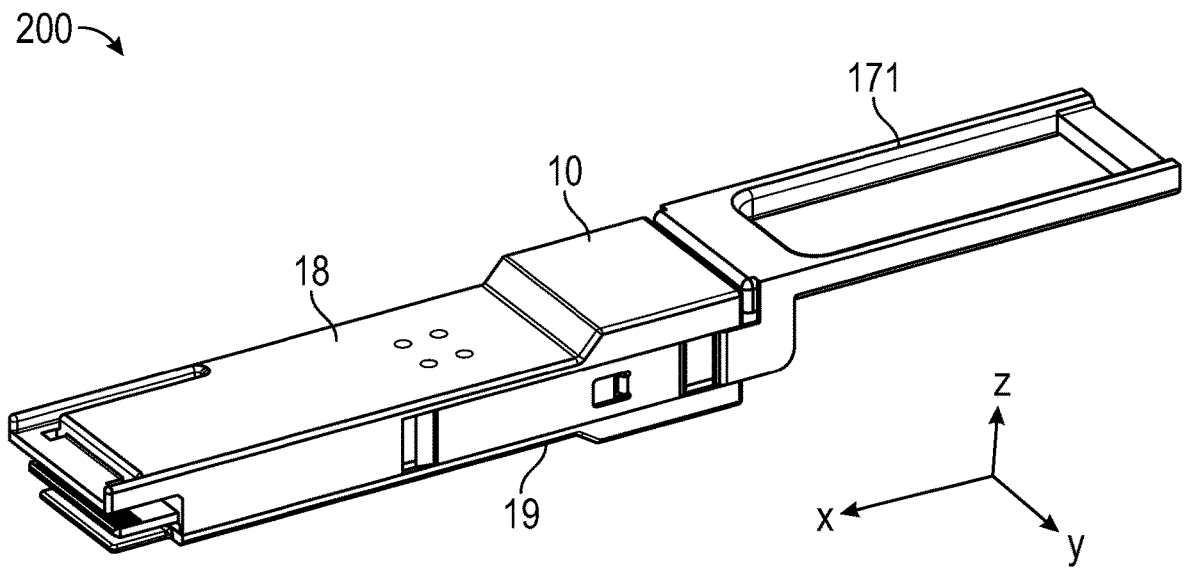
FIG. 1A is a schematic top front perspective view of an optical transceiver module.
Figure 1B:
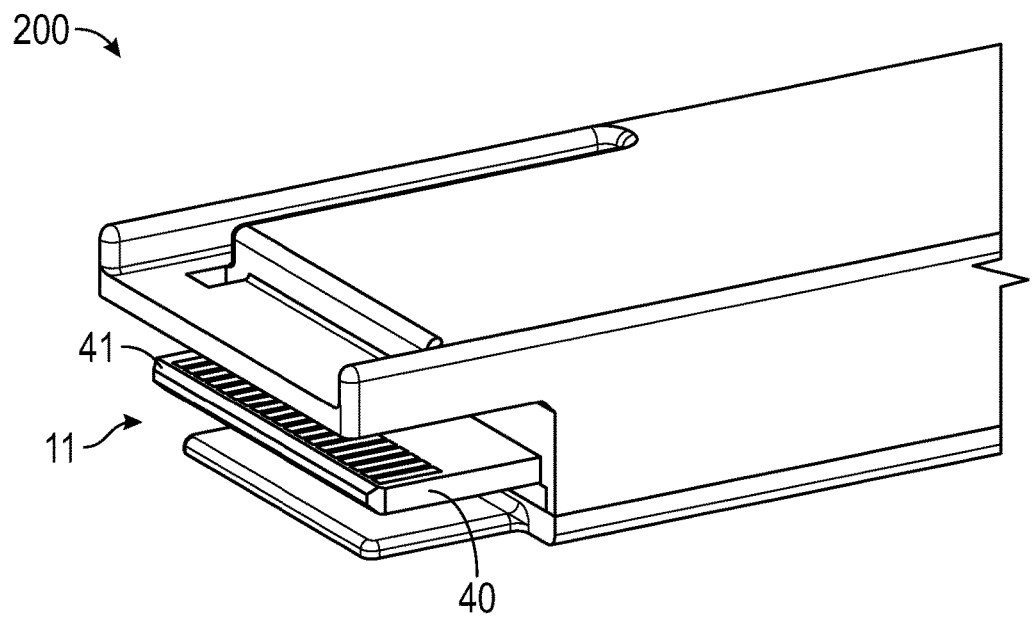
FIG. 1B is a schematic top front perspective view of a portion of the optical transceiver module of FIG. 1A.
Figure 1C:
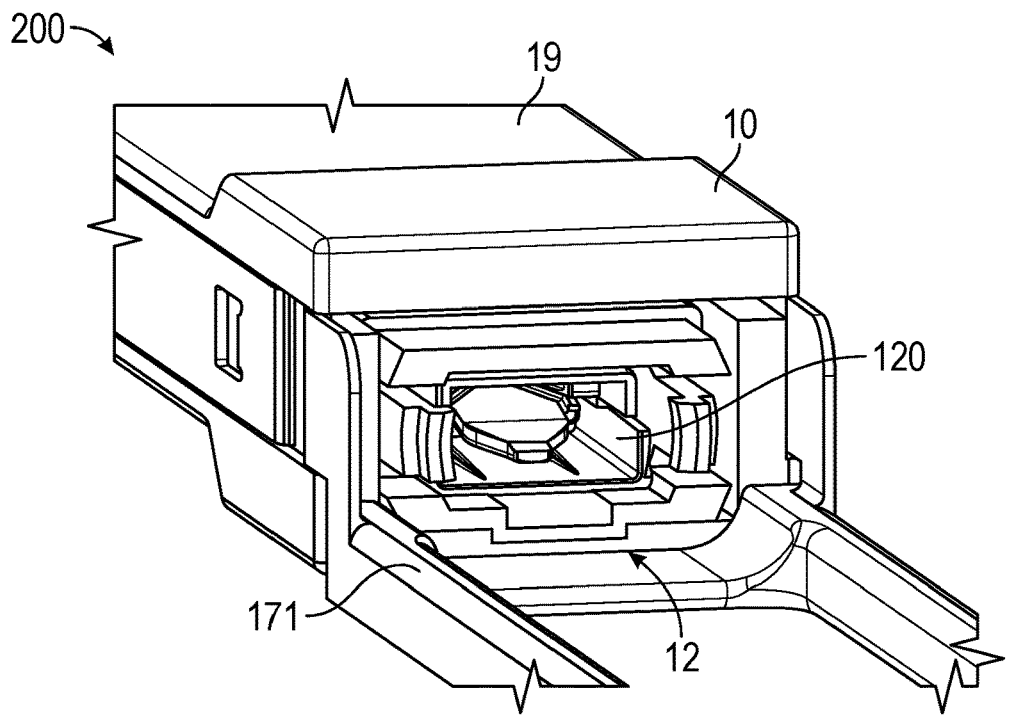
FIG. 1C is a schematic bottom rear perspective view of a portion of the optical transceiver of FIG. 1A.
Figure 1D:
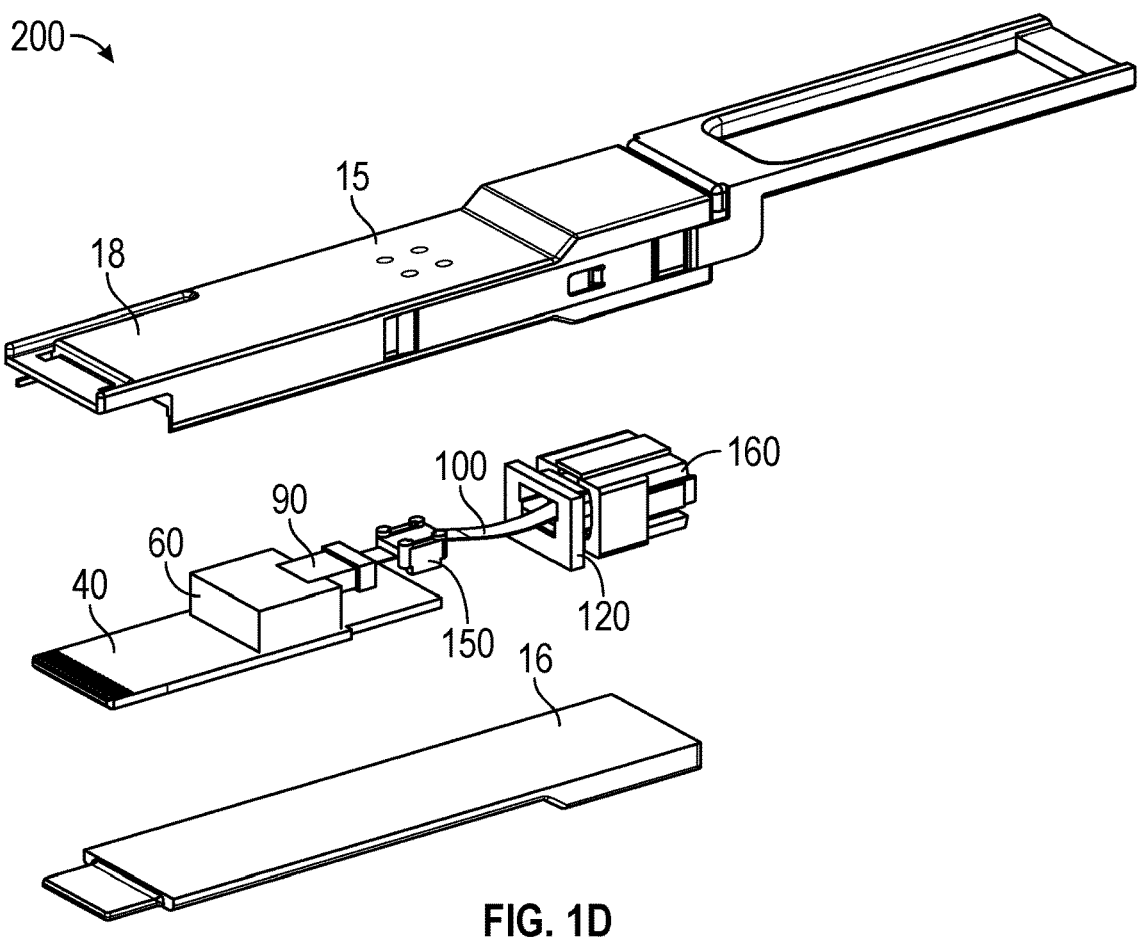
FIG. 1D is a top perspective exploded view of the optical transceiver module of FIG. 1A.

FIG. 1A is a schematic top front perspective view of an optical transceiver module 200. The optical transceiver module 200 has a length along the x-axis, a width along the y-axis and a height or thickness along the z-axis. FIG. 1B is a schematic top front perspective view of a portion of the optical transceiver module 200. FIG. 1C is a schematic bottom rear perspective view of a portion of the optical transceiver module 200. FIG. 1D is a top perspective exploded view of the optical transceiver module 200. FIG. 2 is a schematic perspective view of a portion of optical transceiver module 200, according to some embodiments.

FIG. 3 is a schematic cross-sectional view of a portion of optical transceiver module 200, according to some embodiments.

Figure 11:
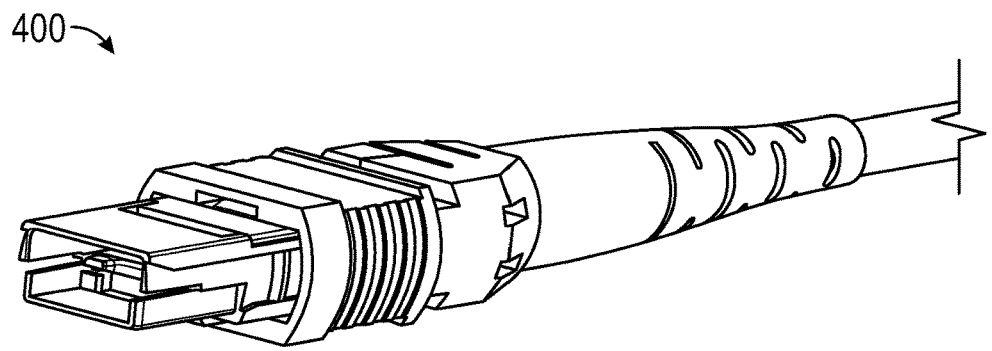
FIG. 11 is a schematic perspective view of a mating optical connector.
Figure 12:
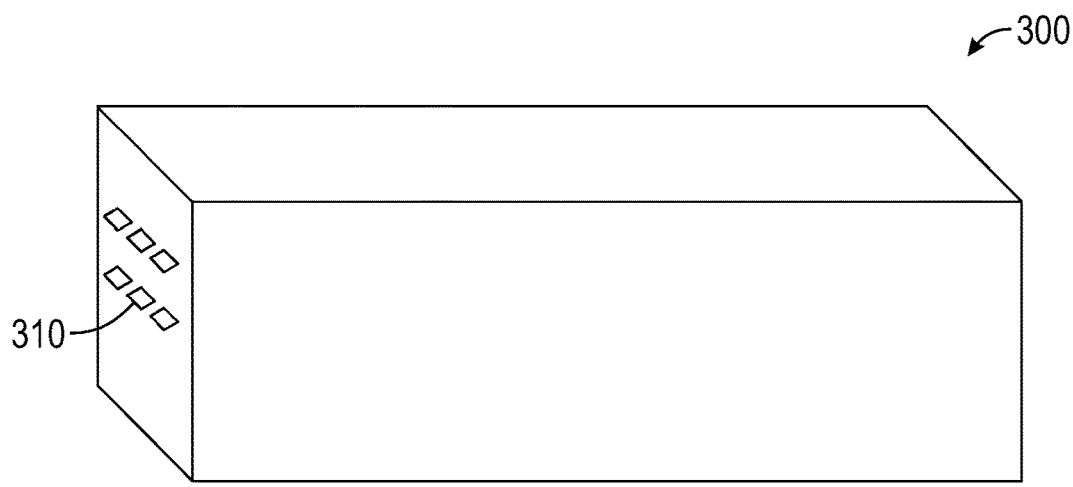
FIG. 12 is a schematic perspective view of a mating electrical connector.
Figure 13:
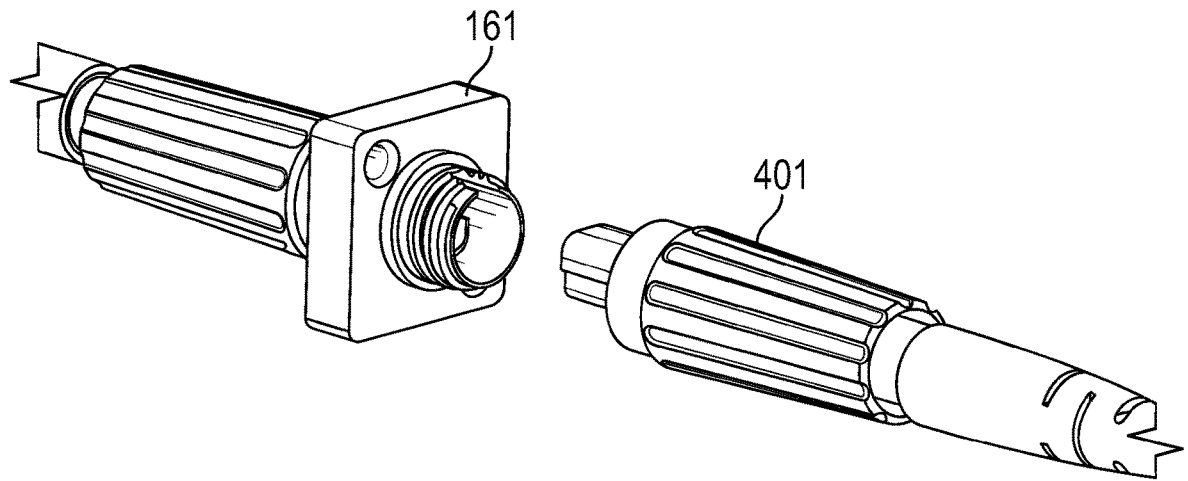
FIG. 13 is a schematic perspective view of a fiber-optic connector (FC) and an FC adaptor.
Figure 14:
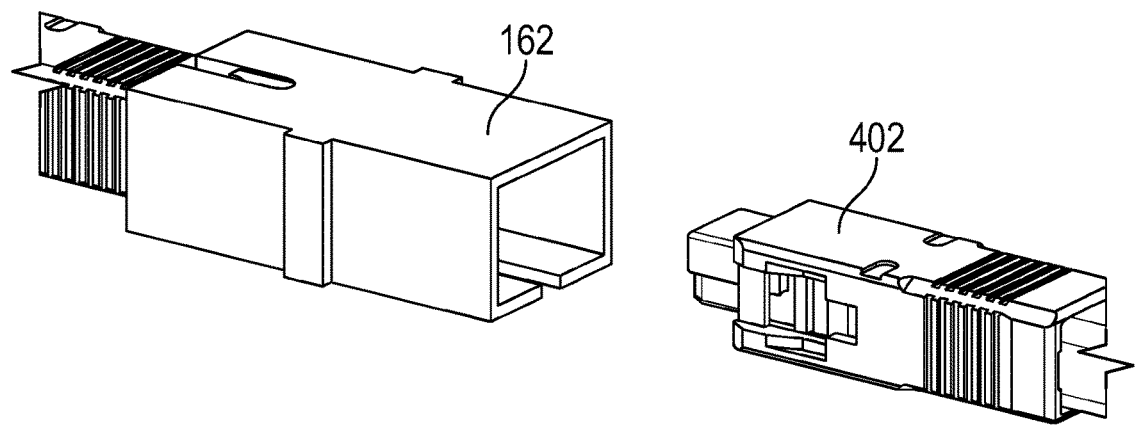
FIG. 14 is a schematic perspective view of a snap-in connector (SC) and an SC adaptor.

In some embodiments, the optical transceiver module 200 includes a housing 10 having an electrical mating end 11 for mating with a mating electrical connector (e.g., mating electrical connector 300 schematically illustrated in FIG. 12), and an opposing optical mating end 12 for mating with a mating optical connector (e.g., mating optical connector 400 schematically illustrated in FIG. 11, or mating optical connector 401 schematically illustrated in FIG. 13, or mating optical connector 402 schematically illustrated in FIG. 14). In some embodiments, the optical transceiver module 200 includes a circuit board assembly 30 disposed in the housing 10. In some embodiments, the circuit board assembly 30 includes a circuit board 40 including a front edge 41 at the electrical mating end 11 of the housing 10 and an opposite rear edge 42; a plurality of conductive pads 43 disposed proximate the front edge 41 for making contact with corresponding electrical contacts (see, e.g., electrical contacts 310 schematically illustrated in FIG. 12) of the mating electrical connector; a transceiver 50 disposed on the circuit board and including at least one light source 51 and at least one light detector 52 (see, e.g., FIG. 3); and an optical coupler 60 disposed on the circuit board 40 and having an input side 61, and an output side 62 optically coupled to, and aligned with, the transceiver 50 (see, e.g., FIG. 3). In some embodiments, the optical transceiver module 200 further includes a ferrule assembly 70 disposed in the housing and including an optical ferrule 80. In some embodiments, the optical transceiver module 200 further includes a pull-tab 171. Pull-tabs for MPO connectors, for example, are known in the art and are described in U.S. Pat. Appl. Pub. No. 2018/0136416 (Kurashima), for example.

In some embodiments, the at least one light source 51 includes a plurality of light sources and the at least one light detector 52 includes a plurality of light detectors. Devices including a plurality of optoelectronic devices (light sources and/or light detectors) are described in U.S. Pat. Appl. Publ. No. 2015/0131948 (Selli et al.), for example. The at least one light detector 52 any suitable type of light detector(s). In some embodiments, the at least one light detector 52 includes one or more of a photoconductor, a photovoltaic device, a phototransistor, and a photodiode. For example, element 52 in FIG. 3 can schematically represent a photoconductor, a photovoltaic device, a phototransistor, or a photodiode, or an array (e.g., arranged along the y-axis) of photoconductors, photovoltaic devices, phototransistors, or photodiodes. The at least one light source 51 can include any suitable type of light source(s). In some embodiments, the at least one light source 51 includes one or more of a light emitted diode (LED), a vertical cavity surface emitting laser (VCSEL), and a laser. For example, element 51 in FIG. 3 can schematically represent an LED, a VCSEL, a laser; or an array (e.g., arranged along the y-axis) of LEDs, VCSELs, or lasers. In some embodiments, the at least one light source 51 includes an array of vertical cavity surface emitting lasers (VCSELs). VCSELs and arrays of VCSELs are known in the art and are described in U.S. Pat. Appl. Publ. Nos. 2014/0211822 (Fattal et al.) and 2005/0019973 (Chua), for example.

Figure 4A:
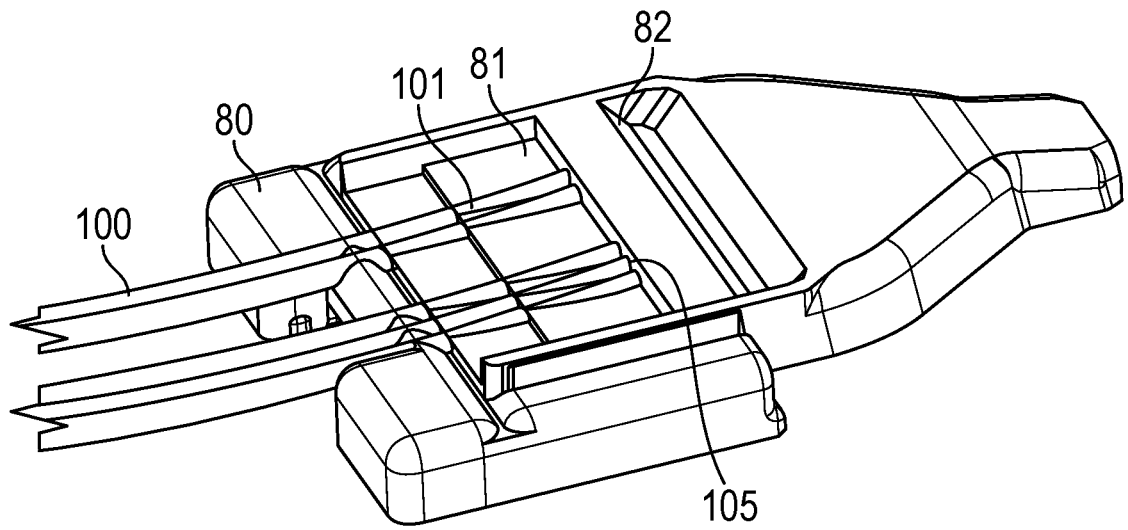
FIG. 4A is a schematic top perspective view of an optical ferrule.
Figure 4B:
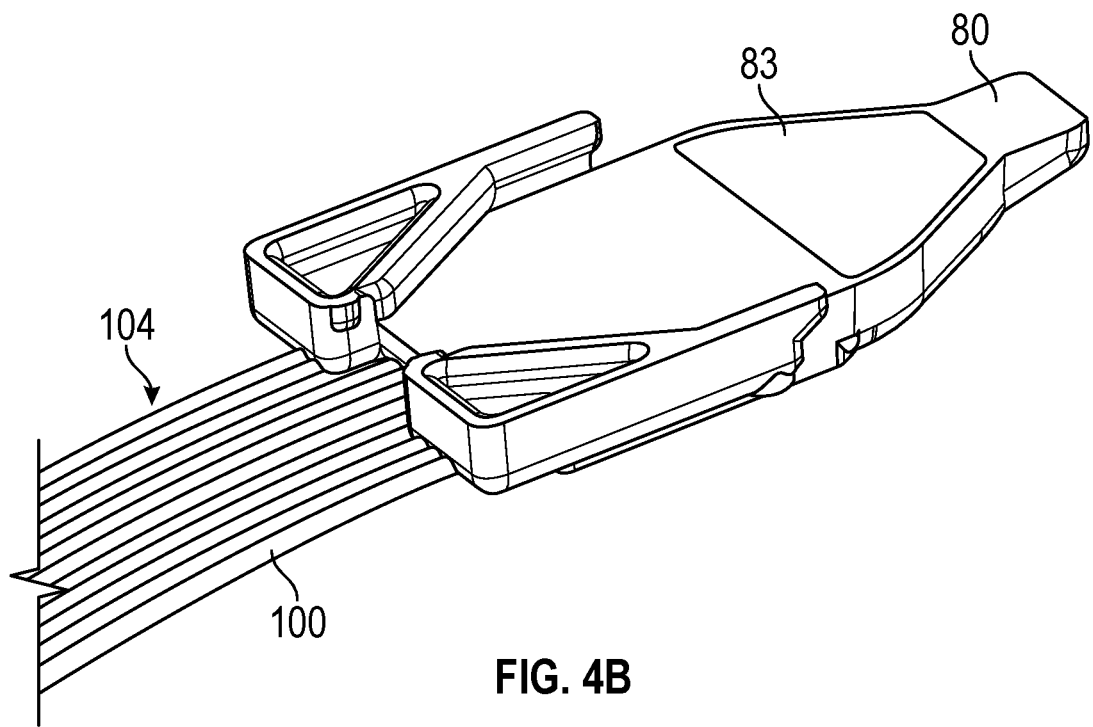
FIG. 4B is a schematic bottom perspective view of the optical ferrule of FIG. 4A.
Figure 4C:
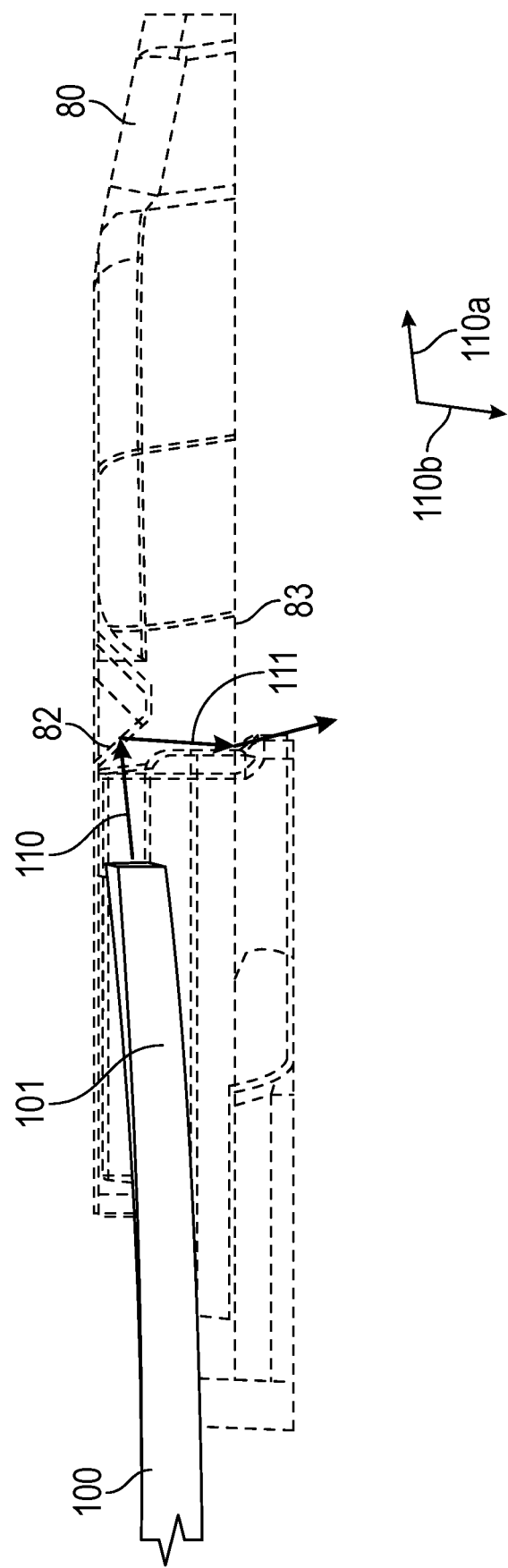
FIG. 4C is a schematic illustration of light exiting an optical fiber attached to the optical ferrule of FIG. 4A.

FIG. 4A is a schematic top perspective view of an optical ferrule 80; FIG. 4B is a schematic bottom perspective view of the optical ferrule 80; and FIG. 4C is a schematic illustration of light 110 exiting an optical fiber 100 attached to the optical ferrule 80. In some embodiments, the optical ferrule 80 includes a first attachment feature 81 for receiving and permanently attaching to at least one optical fiber 100; a light redirecting member 82; and an exit surface 83.

In some embodiments, the ferrule assembly 70 further includes a second attachment feature 90 assembled to the optical coupler 60; and at least one optical fiber 100, a first end portion 101 of which is permanently attached to the first attachment feature 81, and an opposite second end portion 102 of which is permanently attached to the second attachment feature 90 so that: light 110 exiting the at least one optical fiber 100 from the first end portion 101 is received by the light redirecting member 82 along a first direction 110a and redirected by the light redirecting member 82 to a different second direction 110b, where the redirected light 111 exits the optical ferrule from the exit surface 83 of the optical ferrule, and light 112 exiting the at least one optical fiber 100 from the second end portion 102 enters the optical coupler 60 through the input side 61 of the optical coupler 60 and is redirected by the optical coupler 60 toward the transceiver 50 (see, e.g., FIG. 3). In some embodiments, the second attachment feature 90 is permanently assembled to the optical coupler 60. In some embodiments, the second attachment feature 90 is removably assembled to the optical coupler 60.

Figure 5A:
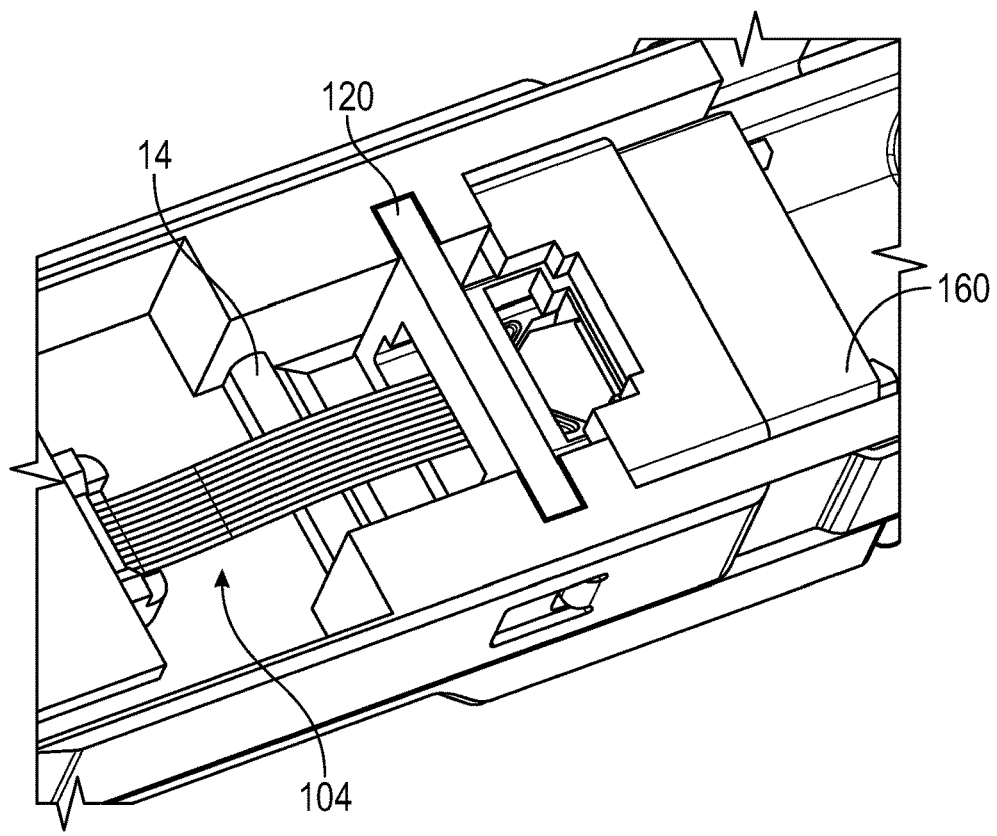
FIGS. 5A-5B are schematic bottom perspective views of a portion of an optical transceiver module with and without an adapter, respectively.
Figure 5B:
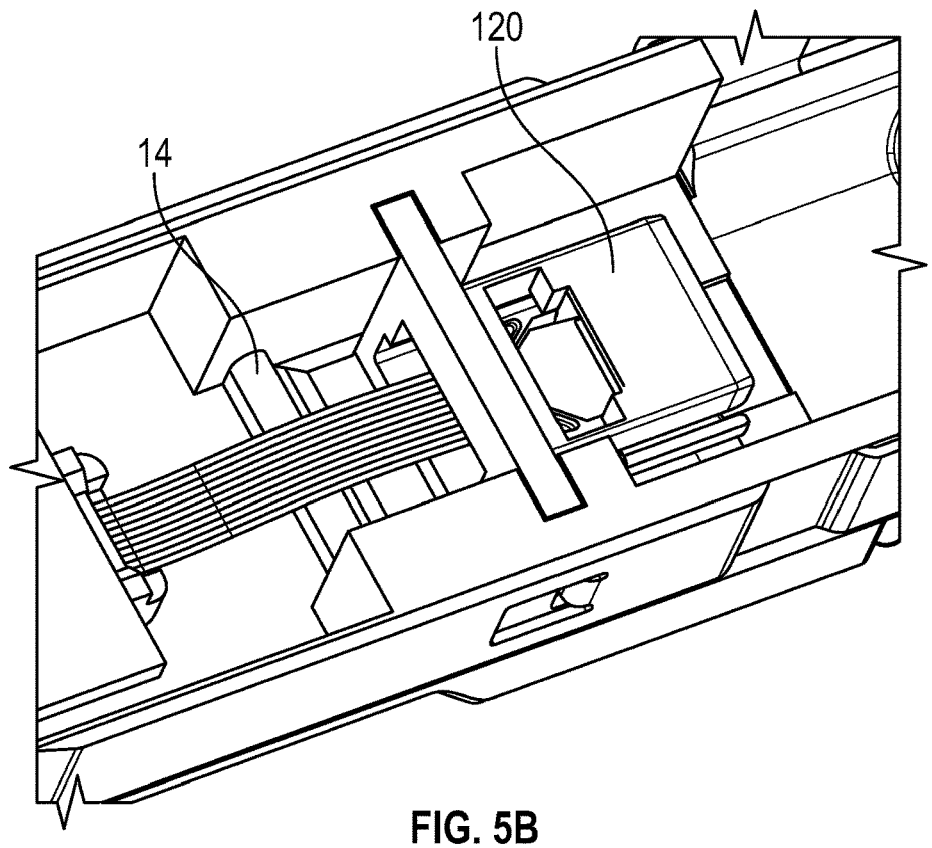
Figure 6A:
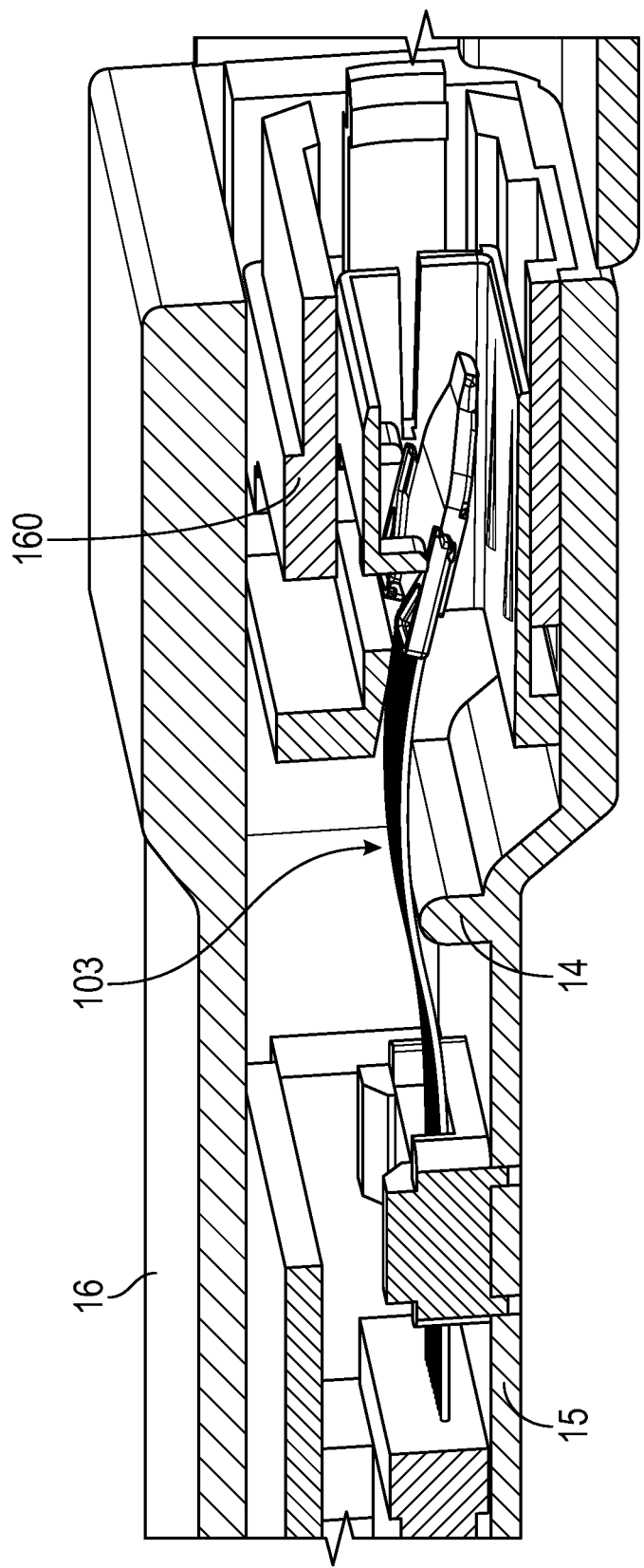
FIG. 6A is a schematic bottom perspective cutaway view of a portion of an optical transceiver module.
Figure 6B:
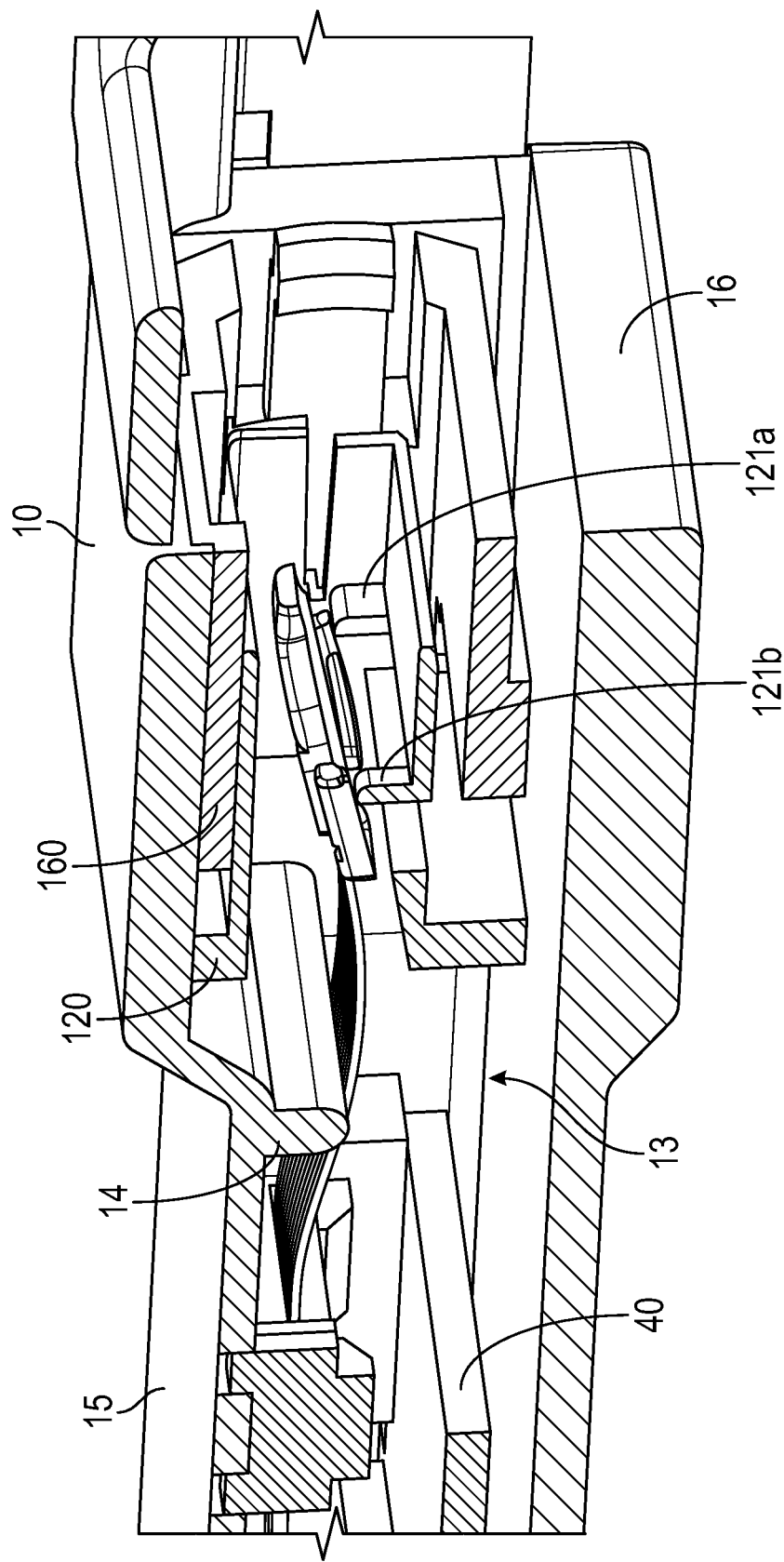
FIG. 6B is a schematic top perspective cutaway view of a portion of the optical transceiver module of FIG. 6A.

FIG. 5A is a schematic bottom perspective view of a portion of optical transceiver module 200, according to some embodiments. In the illustrated embodiment, a hollow adapter 160 which may be removably assembled to the housing 10 is included. FIG. 5B is a schematic bottom perspective view of a portion of the optical transceiver module of FIG. 5A with the hollow adapter 160 removed. FIG. 6A is a schematic bottom perspective cutaway view of a portion of optical transceiver module 200, according to some embodiments, and FIG. 6B is a schematic top perspective cutaway view of a portion of the optical transceiver module of FIG. 6A. In some embodiments, the optical transceiver module 200 further includes a ferrule support 120 removably assembled to an interior 13 (see, e.g., FIG. 6B) of the housing 10 and including at least one support feature 121a, 121b (see, e.g., FIG. 6B), with the optical ferrule 80 resting on the at least one support feature 121a, 121b; and a first support 14 (see, e.g., FIGS. 5A-6B) disposed in the housing 10 and making contact with the at least one optical fiber 100, where the contact causes a bend 103 (see, e.g., FIG. 6A) in the at least one optical fiber 100. The first support 14 may be included so that the at least one optical fiber 100 has a smoothly varying curvature, for example. This can reduce damage (e.g., due to sharp bends) to the at least one optical fiber 100, for example. In some embodiments, the first support 14 is integrally formed with the housing 10 or a portion of the housing 10. In other embodiments, the first support 14 is assembled (e.g., removably assembled or permanently assembled) to the interior 13 of the housing 10. For example, the first support 14 can be a separate component installed in the housing 10. In some embodiments, the first support 14 is integrally formed with the ferrule support 120. For example, the first support 14 and the ferrule support 120 can be different portions of a unitary structure which may be, in some embodiments, removably assembled to the interior 13 of the housing 10.

In some embodiments, the housing 10 includes first housing portion 15 removably assembled to a second housing portion 16. In some embodiments, the first support 14 may be assembled (e.g., removably assembled or permanently assembled) to the first housing portion 15, or may be formed integrally with the first housing portion 15. In some such embodiments or in other embodiments, the ferrule support 120 is removably assembled to the first housing portion 15. In some embodiments, the first and second housing portions 15 and 16 include respective first and second opposing major surfaces 18 and 19 of the housing 10. In some embodiments, the first support 14 is integral to the housing 10 (e.g., integrally formed with a major portion of the housing 10 such as a portion of the housing 10 that includes a major surface of the housing 10). In some embodiments, the first support 14 is integral to the first housing portion 15. Items that were made at the same time as a single part and are not two separate parts subsequently joined together can be described as integral to one another or formed integrally with one another. For example, items formed from a same material in same molding step are integrally formed with one another.

Figure 7:
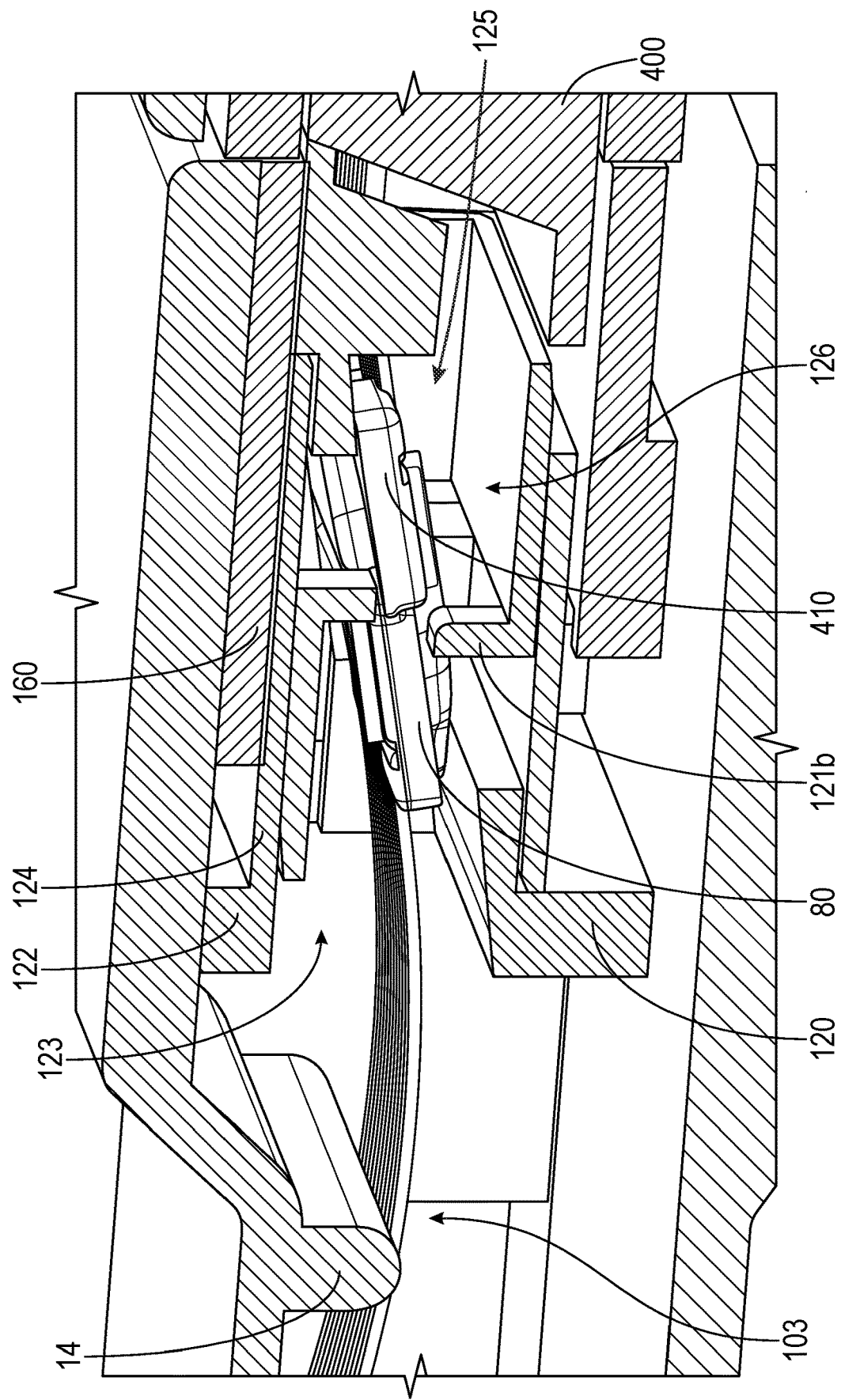
FIG. 7 is schematic cutaway perspective view of a portion of an optical transceiver module.

FIG. 7 is schematic cutaway perspective view of a portion of optical transceiver module 200, according to some embodiments, mated with a mating optical connector 400. In some embodiments, the mating optical connector 400 includes a mating optical ferrule 410, and when the optical transceiver module 200 mates with the mating optical connector 400, the optical ferrule 80 and the mating optical ferrule 410 make contact with, and slide against, each other, the contact causing the optical ferrule 80 to move so that the optical ferrule 80 no longer rests on the at least one support feature 121a, 121b. In some embodiments, the mating between the optical transceiver module 200 and the mating optical connector 400 causes the bend 103 at the first support 14 to increase. For example, in FIG. 7, the optical ferrule 80 and the mating optical ferrule 410 have made contact with, and slid against, each other, where the contact caused the optical ferrule 80 to move upward away from the feature 121b and caused the bend 103 to increase.

Figure 15A:
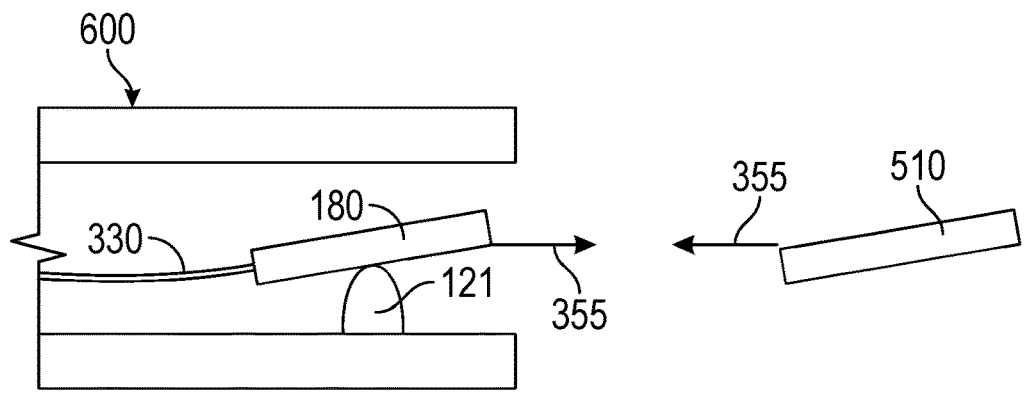
FIGS. 15A-15C schematically illustrate mating of an optical ferrule of an optical transceiver module and a mating optical ferrule of a mating optical connector.
Figure 15B:
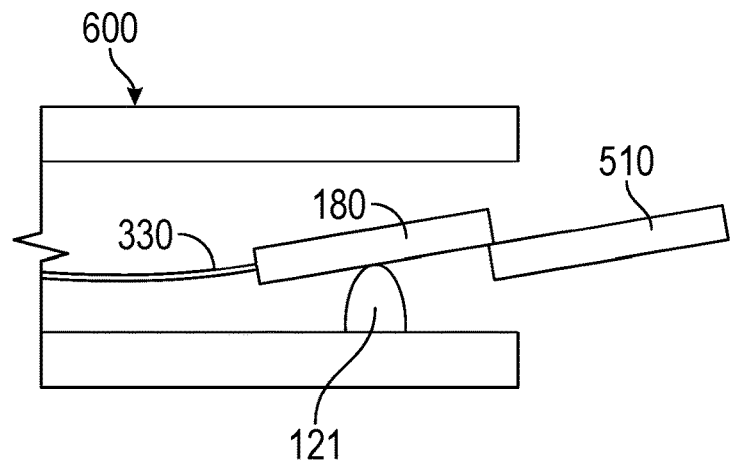
Figure 15C:
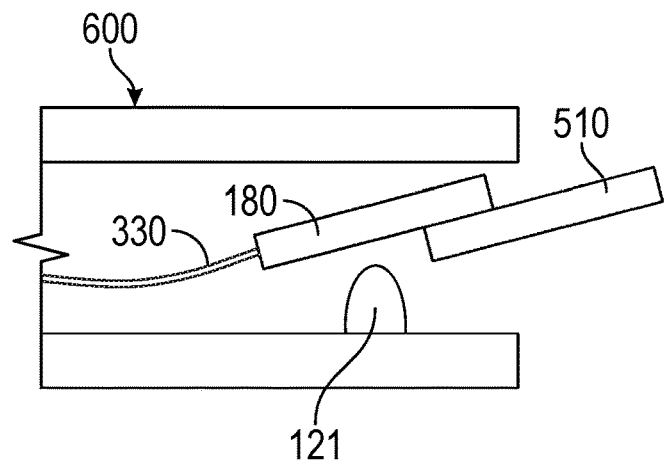

FIGS. 15A-15C are schematic cross-sectional views illustrating an optical ferrule 180 of an optical transceiver module 600 (a portion of which is schematically illustrated) and a mating optical ferrule 510 of a mating optical connector making contact with, and sliding against, each other. FIG. 15A schematically shows the optical ferrule 180 and the mating optical ferrule 510 prior to mating and indicates the relative mating direction 355. The optical ferrule 180 rests on at least one support feature 121 in FIG. 15A. FIG. 15B schematically shows the optical ferrule 180 and the mating optical ferrule 510 upon initial contact and FIG. 15C schematically shows the optical ferrule 180 and the mating optical ferrule 510 after some sliding of the ferrules against each other. As schematically illustrated in FIG. 15C, the contact of the optical ferrule 180 and the mating optical ferrule 510 causes the optical ferrule 180 to move so that the optical ferrule 180 no longer rests on the at least one support feature 121. In the embodiment illustrated in FIGS. 15A-15C, the optical ferrule 180 rotates during mating so that a bend in the at least optical fiber 330 (e.g., at a first support not illustrated in FIGS. 15A-15C) is greater in FIG. 15C than in FIG. 15A.

In some embodiments, as can be seen in FIG. 3, for example, the optical coupler 60 is mounted on the circuit board 40 and includes at least one first optical lens 63 disposed on the input side 61 of the optical coupler 60, where the at least one first optical lens 63 is optically coupled and aligned with an output side 91 of the second attachment feature 90. In some embodiments, the optical coupler 60 is mounted on the circuit board 40 and includes at least one second optical lens 64 disposed on the output side 62 of the optical coupler 60, where the at least one second optical lens 64 is optically coupled and aligned with the transceiver 50. In some embodiments, at least one optical fiber 100 includes a plurality of optical fibers arranged to form a substantially flat (e.g., nominally flat or flat up to minor deviations such as those arising from normal manufacturing variations or stresses being applied to the optical cable) optical ribbon cable 104, as can be seen in FIG. 4B, for example.

In some embodiments, the second attachment feature 90 includes at least one lens 93 disposed on an output side 91 of the second attachment feature 90, the at least one lens 93 aligned with, and optically coupled to, the at least one optical fiber 100 and the input side 61 of the optical coupler 60. The at least one first optical lens 63 and/or the at least one second optical lens 64 and/or the at least one lens 93 may include a plurality of optical lenses (e.g., arranged along the y-axis). For example, each of the at least one first optical lens 63, the at least one second optical lens 64, and the at least one lens 93 may include one lens for each optical fiber in the at least one optical fiber 100. Optical coupling elements including pluralities of lenses are described in U.S. Pat. Appl. No. 2015/0117824 (Wang et al.), for example.

In some embodiments, the first end portion 101 of the at least one optical fiber 100 terminates at at least one first fiber end 105 facing, and optically coupled to, the light redirecting member 82 of the optical ferrule 80 (see, e.g., FIG. 4A), and the second end portion 102 of the at least one optical fiber 100 terminates at at least one second fiber end 106 facing, and optically coupled to, the input side 61 of the optical coupler 60 (see, e.g., FIG. 3).

Figure 8A:
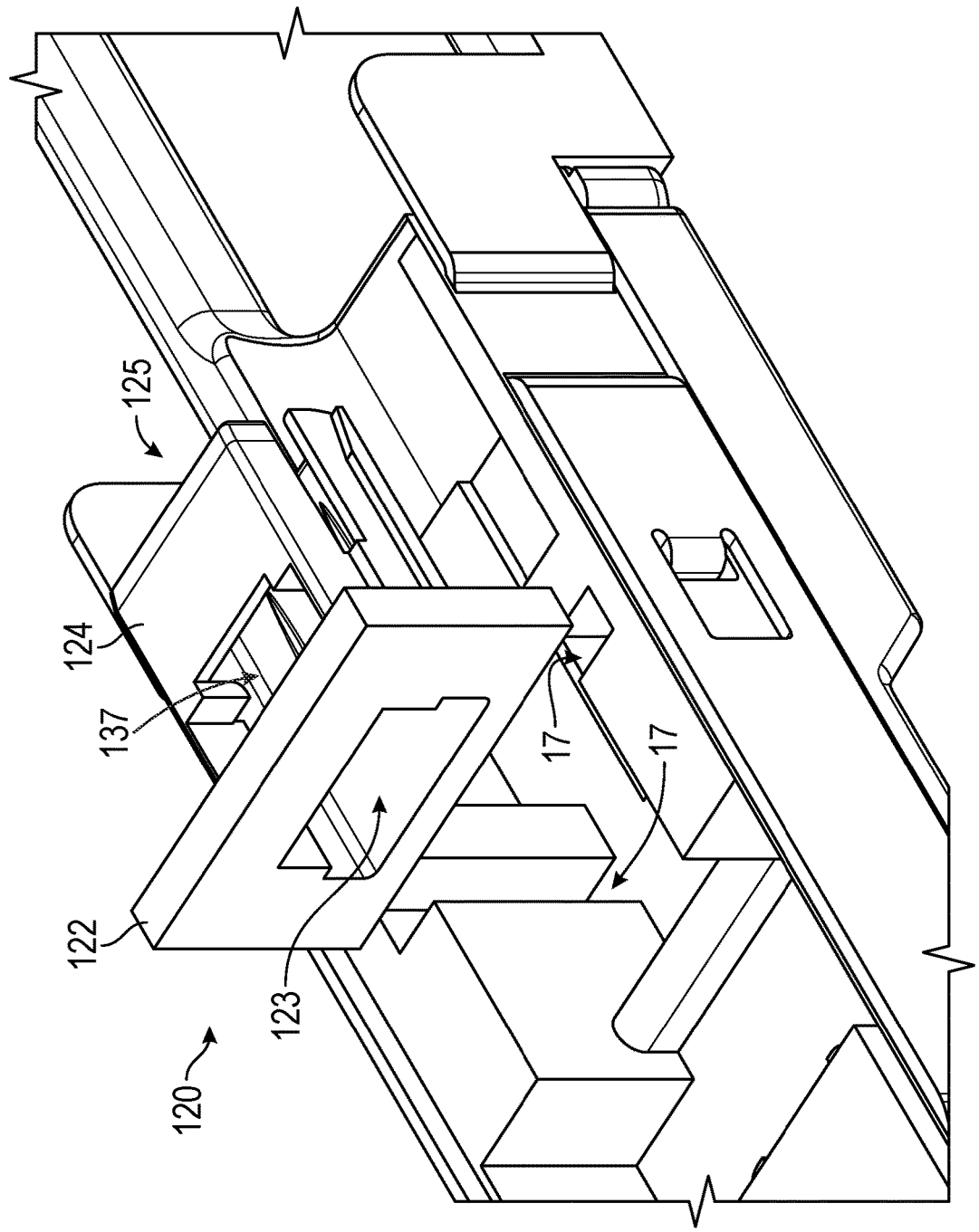
FIG. 8A is a schematic bottom perspective exploded view of a portion of an optical transceiver module including a ferrule support.
Figure 8B:
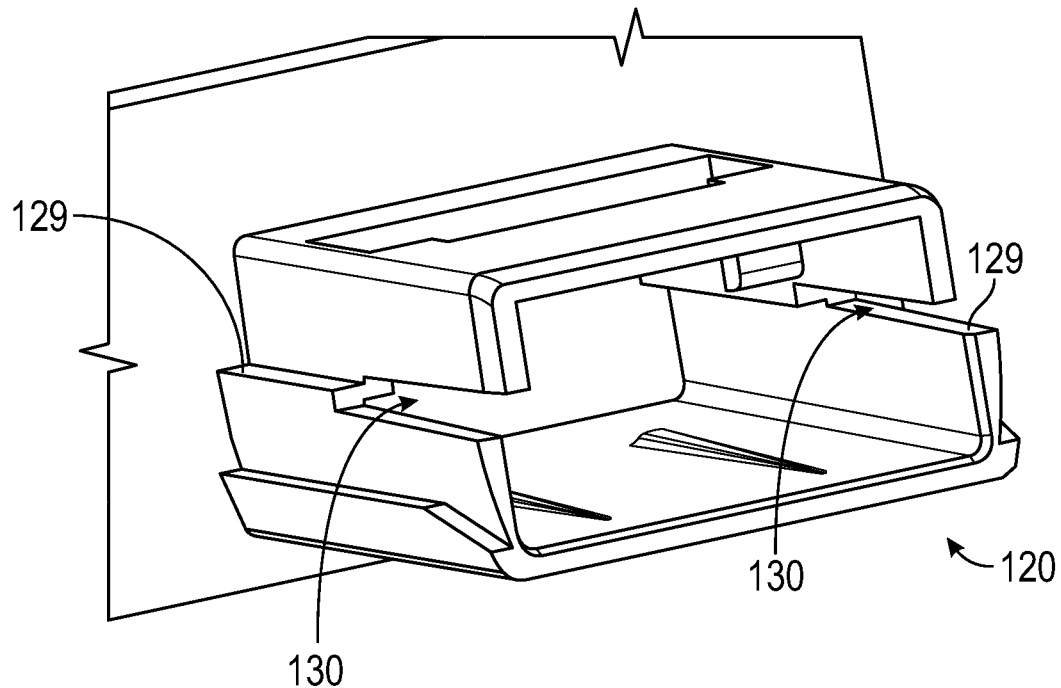
FIG. 8B is a schematic rear perspective view of the ferrule support shown in FIG. 8A.
Figure 8C:
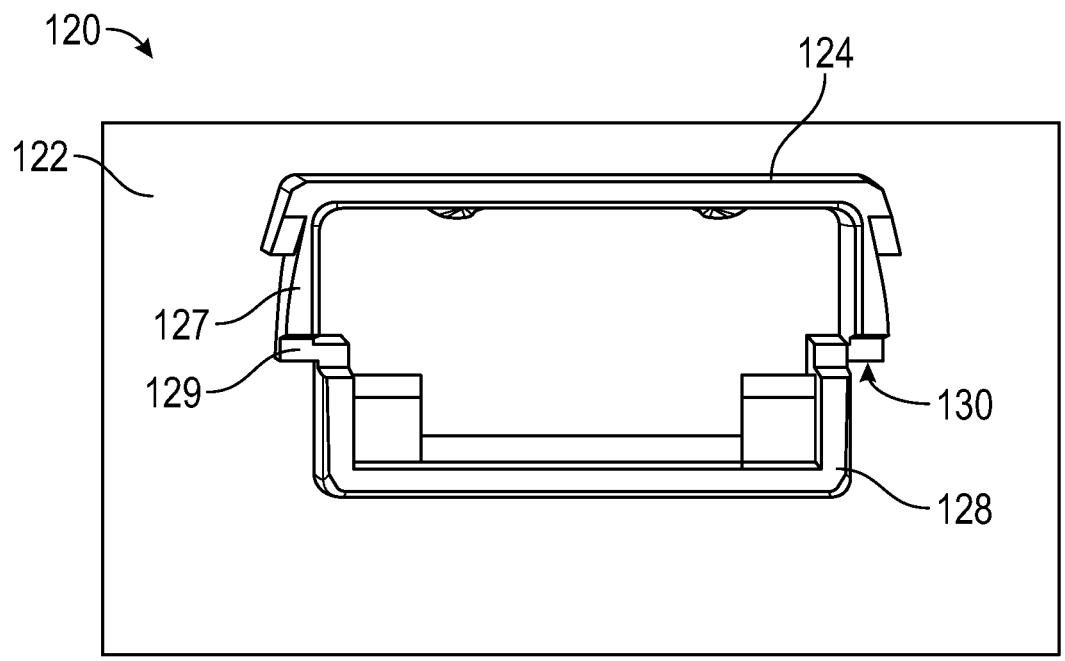
FIG. 8C is a schematic end view of the ferrule support shown in FIG. 8A.
Figure 9:
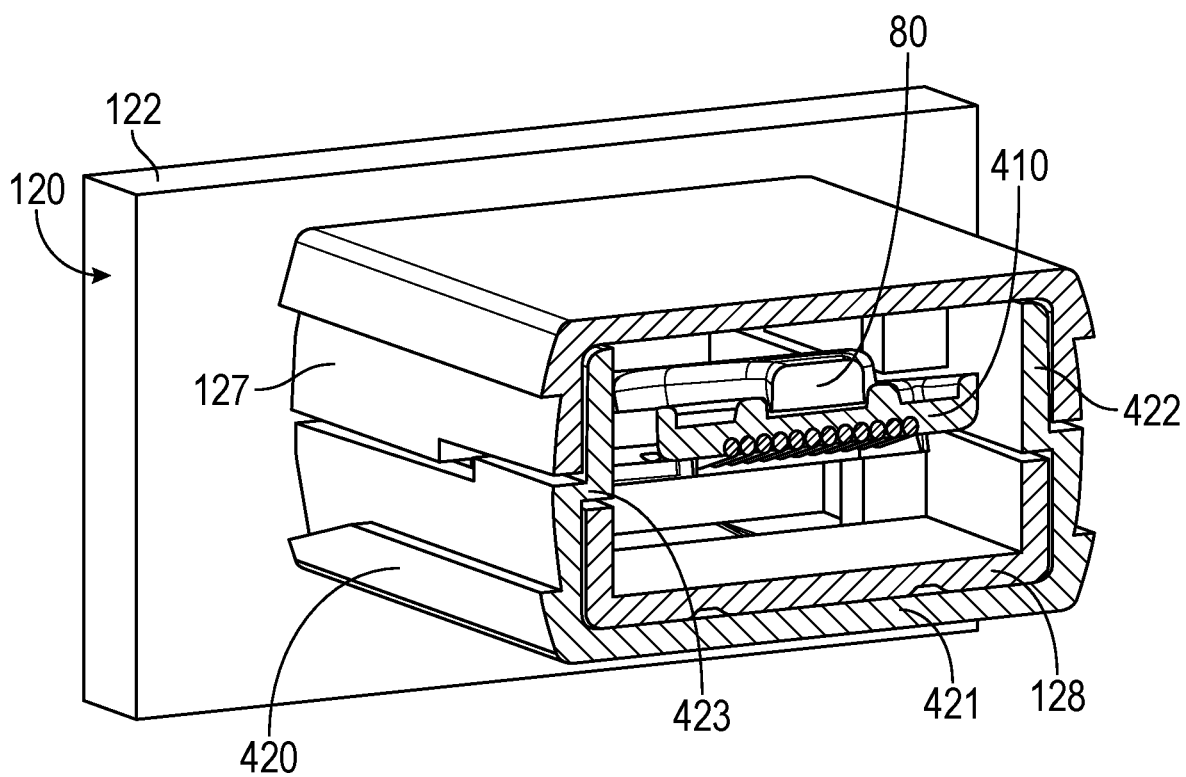
FIG. 9 is a schematic rear perspective view of a ferrule support and a portion of a mating optical connector.

FIG. 8A is a schematic bottom perspective exploded view of a portion of optical transceiver module 200, according to some embodiments, including a ferrule support 120. FIG. 8B is a schematic rear perspective view of the ferrule support 120. FIG. 8C is a schematic end view of the ferrule support 120. FIG. 9 is a schematic rear perspective view of the ferrule support 120 and a portion of a mating optical connector including a mating housing 420 and a mating optical ferrule 410 when the optical transceiver module 200 is mated with a mating optical connector.

In some embodiments, the ferrule support 120 includes a base 122 removably inserted into a slot 17 formed in the interior 13 of the housing 10, where the base defines a first opening 123 therein and the at least one optical fiber 100 is disposed in the first opening 123 (see, e.g., FIG. 7). The ferrule support 120 further includes an elongated hollow portion 124 extending from the base 122 along a length (x-axis or length direction) of the optical transceiver module 200 and defining a second opening 125 therein opposite the first opening 123, such that when the optical transceiver module 200 mates with the mating optical connector 400 including a mating optical ferrule 410, the mating optical ferrule 410 passes through the second opening 125 before mating with the optical ferrule 80. The elongated hollow portion 124 typically extends from the base 122 along the length of the optical transceiver module 200 for only a portion of the total length of the optical transceiver module 200. In some embodiments, as can be seen in FIG. 7, for example, the at least one support feature 121a, 121b is formed in an interior 126 of the elongated hollow portion 124. In some embodiments, the elongated hollow portion 124 includes a wider hollow portion 127 opposite a narrower hollow portion 128, where the wider and narrower hollow portions 127 and 128 defines opposing steps 129 and opposing slots 130 extending along the length (x-axis) of the optical transceiver module 200, such that when the optical transceiver module 200 mates with the mating optical connector, a first portion 421 of a mating housing 420 of the mating optical connector resides on an outside of the narrower hollow portion 128, a second portion 422 of the mating housing 420 resides on an inside of the wider hollow portion 127, and a third portion 423 of the mating housing resides on the opposing steps 129 and in the opposing slots 130. In some embodiments, the ferrule support 120 further includes a third opening 137 facing the exit surface 83 of the optical ferrule 80. The third opening 137 may be included, for example, to facilitate testing, inspection, and/or cleaning of the optical ferrule 80.

In some embodiments, the optical transceiver module 200 further includes a hollow adaptor 160 removably assembled to the housing 10 and surrounding at least a portion of the elongated hollow portion 124 of the ferrule support 120, where the hollow adaptor 160 is configured to receive a front portion of the mating optical connector therein (see, e.g., FIG. 7). In some embodiments, the adaptor 160 is or includes a multi-fiber push on (MPO) adaptor (e.g., adapted to receive a mating optical connector 400 as schematically illustrated in FIG. 11). In some embodiments, the adaptor 160 is or includes a fiber-optic connector (FC) adaptor 161 (e.g., adapted to receive FC mating optical connector 401) as schematically illustrated in FIG. 13. In some embodiments, the adaptor 160 is or includes a snap-in connector (SC) adaptor 162 (e.g., adapted to receive SC mating optical connector 402) as schematically illustrated in FIG. 14.

Figure 10A:
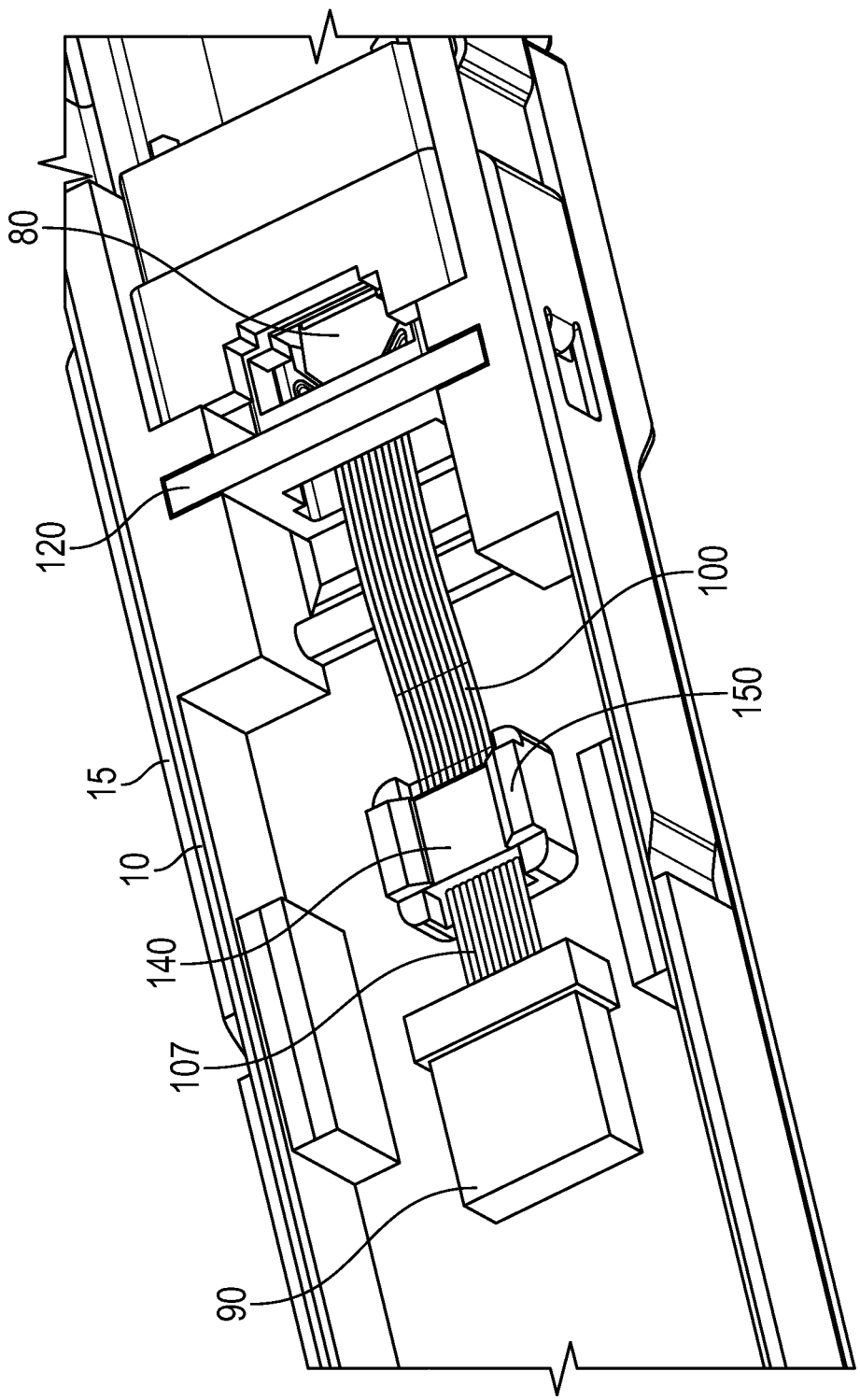
FIG. 10A is a schematic bottom perspective view of a portion of an optical transceiver module.
Figure 10B:
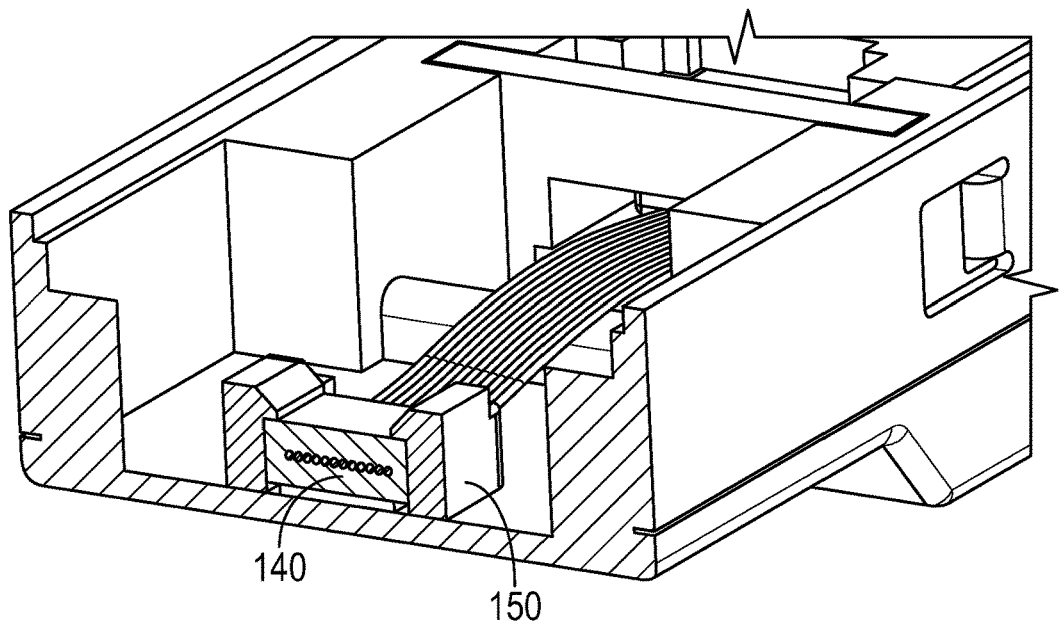
FIG. 10B is a schematic end perspective cutaway view of a portion of the optical transceiver module of FIG. 10A.

FIG. 10A is a schematic bottom perspective view of a portion of optical transceiver module 200, according to some embodiments. FIG. 10B is a schematic end perspective cutaway view of a portion of the optical transceiver module of FIG. 10A. In some embodiments, the ferrule assembly 70 further includes a third attachment feature 140 disposed between the first and second attachment features and permanently attached to a mid portion 107 of the at least one optical fiber 100 between the first and second end portions 101 and 102, as can be seen in FIG. 7 and FIGS. 10A-10B, for example. In some embodiments, the third attachment feature 140 is removably assembled to the housing 10. For example, the third attachment feature 140 can be a collet bonded to the at least one optical fiber 100 and removably assembled to the housing 10. In some embodiments, the optical transceiver module 200 further includes a fixture 150 permanently attached to the housing 10. In some embodiments, the third attachment feature 140 is inserted in the fixture 150 in a length direction (x-axis) of optical transceiver module 200. In some embodiments, the third attachment feature 140 is inserted in the fixture 150 in a thickness direction (z-axis) of optical transceiver module 200 (e.g., by snapping the third attachment feature 140 in place). In some embodiments, the third attachment feature 140 is omitted.

In some embodiments, an optical transceiver module 200 includes a housing 10 having an electrical mating end 11 for mating with a mating electrical connector 300, and an opposing optical mating end 12 for mating with a mating optical connector (e.g., mating optical connector 400); an optical ferrule 80 coupled to an optical fiber 100 and disposed in the housing 10 and including a light redirecting member 82) configured to receive light from the optical fiber 100 along a first direction 110a and redirect the received light along a different second direction 110b, the redirected light 111 exiting the optical ferrule 80 from an exit surface 83 of the optical ferrule 80; and a ferrule support 120 removably assembled to an interior 13 of the housing 10. In some embodiments, the ferrule support 120 includes a base 122 removably inserted into a slot 17 formed in the interior 13 of the housing 10, the base defining a first opening 123 therein, the optical fiber 100 disposed in the first opening 123; and an elongated hollow portion 124 extending from the base along a length (x-axis or length direction) of the optical transceiver module 200 and defining a second opening 125 therein opposite the first opening 123, such that when the optical transceiver module mates with the mating optical connector that include a mating optical ferrule 410, the mating optical ferrule 410 passes through the second opening 125 before mating with the optical ferrule 80. In some embodiments, the elongated hollow portion 124 includes a wider hollow portion 127 opposite a narrower hollow portion 128, the wider and narrower hollow portions 127 and 128 defining opposing steps 129 and opposing slots 130 extending along the length of the optical transceiver module 200, such that when the optical transceiver module 200 mates with the mating optical connector, a first portion 421 of a mating housing 420 of the mating optical connector resides on an outside of the narrower hollow portion 128, a second portion 422 of the mating housing 420 resides on an inside of the wider hollow portion 127, and a third portion 423 of the mating housing 420 resides on the opposing steps 129 and in the opposing slots 130.

In some embodiments, the ferrule support 120 further includes at least one support feature 121*a*, 121*b* formed integrally in an interior 126 of the elongated hollow portion 124, such that when the optical transceiver module 200 mates with the mating optical connector, the optical ferrule 80 moves so that the optical ferrule 80 no longer rests on the at least one support feature 121*a*, 121*b*.

Various portions (e.g., housing, first and second housing portions, optical ferrule) of any of the optical transceiver modules described herein can be made by molding (e.g., injection molding a thermoplastic material) or machining, for example. In some embodiments, the optical ferrule 80 is unitary. In some embodiments, the ferrule support 120 is unitary. In some embodiments, the first and second housing portions 15 and 16 are each unitary.

The present description includes the following illustrative embodiments.

A first embodiment is an optical transceiver module, comprising:
  a housing having an electrical mating end for mating with a mating electrical connector, and an opposing optical mating end for mating with a mating optical connector;
  a circuit board assembly disposed in the housing and comprising:
    a circuit board comprising a front edge at the electrical mating end of the housing and an opposite rear edge;
    a plurality of conductive pads disposed proximate the front edge for making contact with corresponding electrical contacts of the mating electrical connector;
    a transceiver disposed on the circuit board and comprising at least one light source and at least one light detector; and
    an optical coupler disposed on the circuit board and having an input side, and an output side optically coupled to, and aligned with, the transceiver;
  a ferrule assembly disposed in the housing and comprising:
    an optical ferrule comprising:
      a first attachment feature for receiving and permanently attaching to at least one optical fiber;
      a light redirecting member; and
      an exit surface;
    a second attachment feature assembled to the optical coupler; and
    at least one optical fiber, a first end portion of which is permanently attached to the first attachment feature, and an opposite second end portion of which is permanently attached to the second attachment feature so that:
      light exiting the at least one optical fiber from the first end portion is received by the light redirecting member along a first direction and redirected by the light redirecting member to a different second direction, the redirected light exiting the optical ferrule from the exit surface of the optical ferrule, and
      light exiting the at least one optical fiber from the second end portion enters the optical coupler through the input side of the optical coupler and is redirected by the optical coupler toward the transceiver;
  a ferrule support removably assembled to an interior of the housing and comprising at least one support feature, the optical ferrule resting on the at least one support feature; and
  a first support disposed in the housing and making contact with the at least one optical fiber, the contact causing a bend in the at least one optical fiber.

A second embodiment is the optical transceiver module of the first embodiment, wherein the housing comprises a first housing portion removably assembled to a second housing portion, wherein the first support is formed integrally with the first housing portion, and wherein the ferrule support is removably assembled to the first housing portion.

A third embodiment is the optical transceiver module of the second embodiment, wherein the first and second housing portions comprise respective first and second opposing major surfaces of the housing.

A fourth embodiment is the optical transceiver module of any one of the first through third embodiments, wherein the mating optical connector comprises a mating optical ferrule, and wherein when the optical transceiver module mates with the mating optical connector, the optical ferrule and the mating optical ferrule make contact with, and slide against, each other, the contact causing the optical ferrule to move so that the optical ferrule no longer rests on the at least one support feature.

A fifth embodiment is the optical transceiver module of any one of the first through fourth embodiments, wherein the mating between the optical transceiver module and the mating optical connector causes the bend at the first support to increase.

A sixth embodiment is the optical transceiver module of any one of the first through fifth embodiments, wherein the optical coupler is mounted on the circuit board and comprises at least one first optical lens disposed on the input side of the optical coupler, the at least one first optical lens optically coupled and aligned with an output side of the second attachment feature.

A seventh embodiment is the optical transceiver module of any one of the first through sixth embodiments, wherein the optical coupler is mounted on the circuit board and comprises at least one second optical lens disposed on the output side of the optical coupler, the at least one second optical lens optically coupled and aligned with the transceiver.

An eighth embodiment is the optical transceiver module of any one of the first through seventh embodiments, wherein the first end portion of the at least one optical fiber terminates at at least one first fiber end facing, and optically coupled to, the light redirecting member of the optical ferrule, and the second end portion of the at least one optical fiber terminates at at least one second fiber end facing, and optically coupled to, the input side of the optical coupler.

A ninth embodiment is the optical transceiver module of any one of the first through eighth embodiments, wherein the second attachment feature comprises at least one lens disposed on an output side of the second attachment feature, the at least one lens aligned with, and optically coupled to, the at least one optical fiber and the input side of the optical coupler.

A tenth embodiment is the optical transceiver module of any one of the first through ninth embodiments, wherein the ferrule support comprises:
  a base removably inserted into a slot formed in the interior of the housing, the base defining a first opening therein, the at least one optical fiber disposed in the first opening; and
  an elongated hollow portion extending from the base along a length of the optical transceiver module and defining a second opening therein opposite the first opening, such that when the optical transceiver module mates with the mating optical connector comprising a mating optical ferrule, the mating optical ferrule passes through the second opening before mating with the optical ferrule.

An eleventh embodiment is the optical transceiver module of the tenth embodiment, wherein the at least one support feature is formed in an interior of the elongated hollow portion.

A twelfth embodiment is the optical transceiver module of the tenth or eleventh embodiments, wherein the elongated hollow portion comprises a wider hollow portion opposite a narrower hollow portion, the wider and narrower hollow portions defining opposing steps and opposing slots extending along the length of the optical transceiver module, such that when the optical transceiver module mates with the mating optical connector, a first portion of a mating housing of the mating optical connector resides on an outside of the narrower hollow portion, a second portion of the mating housing resides on an inside of the wider hollow portion, and a third portion of the mating housing resides on the opposing steps and in the opposing slots.

A thirteenth embodiment is the optical transceiver module of any one of the tenth through twelfth embodiments, further comprising a hollow adaptor removably assembled to the housing and surrounding at least a portion of the elongated hollow portion of the ferrule support, the hollow adaptor configured to receive a front portion of the mating optical connector therein.

A fourteenth embodiment is an optical transceiver module, comprising:
  a housing having an electrical mating end for mating with a mating electrical connector, and an opposing optical mating end for mating with a mating optical connector;
  an optical ferrule coupled to an optical fiber and disposed in the housing and comprising a light redirecting member configured to receive light from the optical fiber along a first direction and redirect the received light along a different second direction, the redirected light exiting the optical ferrule from an exit surface of the optical ferrule; and
  a ferrule support removably assembled to an interior of the housing and comprising:
    a base removably inserted into a slot formed in the interior of the housing, the base defining a first opening therein, the optical fiber disposed in the first opening; and
    an elongated hollow portion extending from the base along a length of the optical transceiver module and defining a second opening therein opposite the first opening, such that when the optical transceiver module mates with the mating optical connector comprising a mating optical ferrule, the mating optical ferrule passes through the second opening before mating with the optical ferrule;
  wherein the elongated hollow portion comprises a wider hollow portion opposite a narrower hollow portion, the wider and narrower hollow portions defining opposing steps and opposing slots extending along the length of the optical transceiver module, such that when the optical transceiver module mates with the mating optical connector, a first portion of a mating housing of the mating optical connector resides on an outside of the narrower hollow portion, a second portion of the mating housing resides on an inside of the wider hollow portion, and a third portion of the mating housing resides on the opposing steps and in the opposing slots.

A fifteenth embodiment is the optical transceiver module of the fourteenth embodiment wherein the ferrule support further comprises at least one support feature formed integrally in an interior of the elongated hollow portion, such that when the optical transceiver module mates with the mating optical connector, the optical ferrule moves so that the optical ferrule no longer rests on the at least one support feature.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof

What is claimed is:
1. An optical transceiver module, comprising:
  a housing having an electrical mating end for mating with a mating electrical connector, and an opposing optical mating end for mating with a mating optical connector;
  a circuit board assembly disposed in the housing and comprising:
    a circuit board comprising a front edge at the electrical mating end of the housing and an opposite rear edge;
    a plurality of conductive pads disposed proximate the front edge for making contact with corresponding electrical contacts of the mating electrical connector;
    a transceiver disposed on the circuit board and comprising at least one light source and at least one light detector; and
    an optical coupler disposed on the circuit board and having an input side, and an output side optically coupled to, and aligned with, the transceiver;

a ferrule assembly disposed in the housing and comprising:
  an optical ferrule comprising:
    a first attachment feature for receiving and permanently attaching to at least one optical fiber;
    a light redirecting member; and
    an exit surface;
  a second attachment feature assembled to the optical coupler; and
  at least one optical fiber, a first end portion of which is permanently attached to the first attachment feature, and an opposite second end portion of which is permanently attached to the second attachment feature so that:
    light exiting the at least one optical fiber from the first end portion is received by the light redirecting member along a first direction and redirected by the light redirecting member to a different second direction, the redirected light exiting the optical ferrule from the exit surface of the optical ferrule, and
    light exiting the at least one optical fiber from the second end portion enters the optical coupler through the input side of the optical coupler and is redirected by the optical coupler toward the transceiver;
a ferrule support removably assembled to an interior of the housing and comprising at least one support feature, the optical ferrule resting on the at least one support feature; and
a first support disposed in the housing and making contact with the at least one optical fiber, the contact causing a bend in the at least one optical fiber,
wherein the ferrule support comprises:
  a base removably inserted into a slot formed in the interior of the housing, the base defining a first opening therein, the at least one optical fiber disposed in the first opening; and
  an elongated hollow portion extending from the base along a length of the optical transceiver module and defining a second opening therein opposite the first opening, such that when the optical transceiver module mates with the mating optical connector comprising a mating optical ferrule, the mating optical ferrule passes through the second opening before mating with the optical ferrule.

2. The optical transceiver module of claim 1, wherein the housing comprises a first housing portion removably assembled to a second housing portion, wherein the first support is formed integrally with the first housing portion, and wherein the ferrule support is removably assembled to the first housing portion.

3. The optical transceiver module of claim 2, wherein the first and second housing portions comprise respective first and second opposing major surfaces of the housing.

4. The optical transceiver module of claim 1, wherein the mating optical connector comprises a mating optical ferrule, and wherein when the optical transceiver module mates with the mating optical connector, the optical ferrule and the mating optical ferrule make contact with, and slide against, each other, the contact causing the optical ferrule to move so that the optical ferrule no longer rests on the at least one support feature.

5. The optical transceiver module of claim 1, wherein the mating between the optical transceiver module and the mating optical connector causes the bend at the first support to increase.

6. The optical transceiver module of claim 1, wherein the optical coupler is mounted on the circuit board and comprises at least one first optical lens disposed on the input side of the optical coupler, the at least one first optical lens optically coupled and aligned with an output side of the second attachment feature.

7. The optical transceiver module of claim 1, wherein the optical coupler is mounted on the circuit board and comprises at least one second optical lens disposed on the output side of the optical coupler, the at least one second optical lens optically coupled and aligned with the transceiver.

8. The optical transceiver module of claim 1, wherein the first end portion of the at least one optical fiber terminates at at least one first fiber end facing, and optically coupled to, the light redirecting member of the optical ferrule, and the second end portion of the at least one optical fiber terminates at at least one second fiber end facing, and optically coupled to, the input side of the optical coupler.

9. The optical transceiver module of claim 1, wherein the second attachment feature comprises at least one lens disposed on an output side of the second attachment feature, the at least one lens aligned with, and optically coupled to, the at least one optical fiber and the input side of the optical coupler.

10. The optical transceiver module of claim 1, wherein the at least one support feature is formed in an interior of the elongated hollow portion.

11. The optical transceiver module of claim 1, wherein the elongated hollow portion comprises a wider hollow portion opposite a narrower hollow portion, the wider and narrower hollow portions defining opposing steps and opposing slots extending along the length of the optical transceiver module, such that when the optical transceiver module mates with the mating optical connector, a first portion of a mating housing of the mating optical connector resides on an outside of the narrower hollow portion, a second portion of the mating housing resides on an inside of the wider hollow portion, and a third portion of the mating housing resides on the opposing steps and in the opposing slots.

12. The optical transceiver module of claim 1 further comprising a hollow adaptor removably assembled to the housing and surrounding at least a portion of the elongated hollow portion of the ferrule support, the hollow adaptor configured to receive a front portion of the mating optical connector therein.

13. An optical transceiver module, comprising:
  a housing having an electrical mating end for mating with a mating electrical connector, and an opposing optical mating end for mating with a mating optical connector;
  an optical ferrule coupled to an optical fiber and disposed in the housing and comprising a light redirecting member configured to receive light from the optical fiber along a first direction and redirect the received light along a different second direction, the redirected light exiting the optical ferrule from an exit surface of the optical ferrule; and
  a ferrule support removably assembled to an interior of the housing and comprising:
    a base removably inserted into a slot formed in the interior of the housing, the base defining a first opening therein, the optical fiber disposed in the first opening; and
    an elongated hollow portion extending from the base along a length of the optical transceiver module and defining a second opening therein opposite the first opening, such that when the optical transceiver module mates with the mating optical connector comprising a mating optical ferrule, the mating optical ferrule passes through the second opening before mating with the optical ferrule;

wherein the elongated hollow portion comprises a wider hollow portion opposite a narrower hollow portion, the wider and narrower hollow portions defining opposing steps and opposing slots extending along the length of the optical transceiver module, such that when the optical transceiver module mates with the mating optical connector, a first portion of a mating housing of the mating optical connector resides on an outside of the narrower hollow portion, a second portion of the mating housing resides on an inside of the wider hollow portion, and a third portion of the mating housing resides on the opposing steps and in the opposing slots.

14. The optical transceiver module of claim 13, wherein the ferrule support further comprises at least one support feature formed integrally in an interior of the elongated hollow portion, such that when the optical transceiver module mates with the mating optical connector, the optical ferrule moves so that the optical ferrule no longer rests on the at least one support feature.

* * * * *